Dec. 22, 1942.  T. J. HEALY  2,305,697
UNIVERSAL COUPLING
Filed Sept. 29, 1941
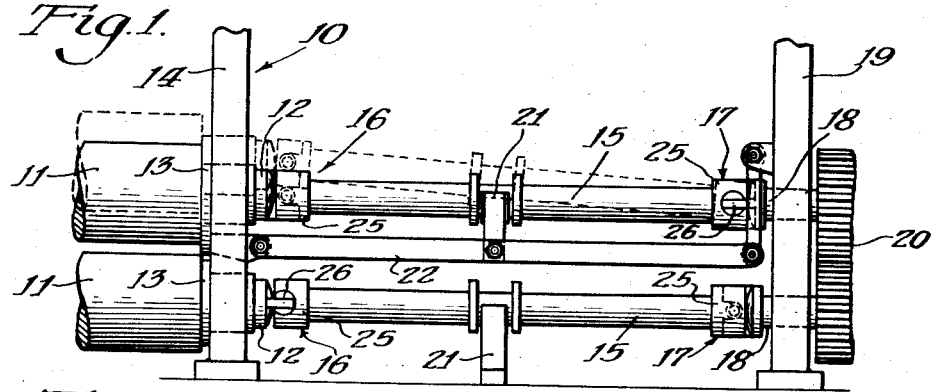

Patented Dec. 22, 1942

2,305,697

UNITED STATES PATENT OFFICE 2,305,697

UNIVERSAL COUPLING

Thomas J. Healy, Baltimore, Md., assignor to The American Brake Shoe and Foundry Company, Wilmington, Del., a corporation of Delaware Application September 29, 1941, Serial No. 412,751

16 Claims. (Cl. 64—7)

This invention relates to bearings and particularly to slipper bearings employed in universal driving connections and the like.

Universal joints are generally employed for coupling shafts end to end, particularly where it is desired to transmit torque from a driving shaft to a driven shaft which may be angularly disposed with respect to the driving shaft. Such a joint usually comprises a female member formed on or secured to an end of one of the shafts and a male member similarly provided on the adjacent end of the other shaft, the male member being insertable into the female member to afford a driving connection when the shafts are assembled in operative relation to each other. When the shafts are not in alignment longitudinally, the male and female members must be so coupled as to enable a certain amount of relative movement of these members to take place as the shafts are rotated, and to this end a pivotal interconnection and what are known as slipper bearings are interposed between the male and female members to provide for relative pivoted movement of these members about axes at right angles to each other.

As commonly constructed, the male member of the universal joint consists of a flat fish-tail or tongue and a bifurcation is provided in the female member to receive this tongue. The opposed faces of the branches of the bifurcation in the female member are arcuately recessed transversely across the female member and the slipper bearings are in the form of segments of a cylinder so that they may be disposed in the arcuate bearing surfaces afforded by the aforesaid recesses, two such segmental slipper bearings being employed in each universal joint and being disposed one on each side of the male tongue with their cylindrical surfaces conforming to the aforesaid arcuate bearing surfaces and their flat faces engaging opposite faces of the tongue. A centrally located bearing or spacing pin interconnects the slipper bearings and is adapted to be received in a bifurcation or other suitable opening in the tongue of the male member to thereby afford a pivotal interconnection. As the male and female members are rotated, torque is transmitted from one to the other through the medium of the slipper bearings and the tongue and upon disalignment of the male and female members, relative pivotal movement about the bearing pin as a center and of the female member with respect to the cylindrical axis of the slipper bearings compensates for the disalignment.

Obviously, the rotative force applied to each slipper bearing is not uniformly distributed throughout such bearing but is exerted substantially entirely upon that portion of the bearing disposed on one or the other side of the bearing pin, depending upon the direction of rotation and whether it is the male or female member which does the driving. Moreover, this force tends to vary in magnitude at different points on that portion of the slipper bearing which is under stress, becoming progressively greater as the distance from the bearing pin increases. Due to this non-uniform character of the rotational forces acting upon the slipper bearings, there is a tendency to cause comparatively rapid wearing away of the more heavily stressed end section of each slipper bearing and its cooperating bearing surface in the female member, and substantially no wear of the portion of the bearing disposed on the other side of the bearing pin. There is also greater wear at the one end of the bearing than at the medium portion thereof, particularly where the driving and driven shafts are operated continuously in the same manner over long periods of time as in the case of the continuous type of steel rolling mills.

Heretofore, slipper bearings of the conventional type described hereinabove have been of one-piece construction and in most instances have been made of rigid or reinforced material so that they have been subject to breakage when undue bending stresses were applied to them under normal working conditions. Because there is such unequal wearing away of each slipper bearing and its cooperating bearing surface at various points throughout the length of such bearing, the end section of the bearing where the greatest wear occurs is often not as well supported as are other sections of the bearing so that severe bending stresses may be set up which are apt to fracture the bearing, causing the more heavily stressed end section to break away from the rest of the bearing. This is detrimental since it usually requires interrupting operation of the apparatus in which the bearing is included to make replacement of the defective slipper bearing and this results in production delays and is, moreover, dangerous in that the broken end piece of the defective bearing may be thrown outwardly from the joint due to centrifugal forces while the machine is in operation, possibly causing injury to nearby persons.

It has been proposed to make slipper bearings of fibrous or resinous material for so to do is quite advantageous but in many instances it is still preferred to use the relatively rigid metallic slipper bearings which are rather resistant to the aforesaid bending stresses and the like.

In view of the foregoing, it is a primary object of the present invention to decrease the likelihood of breakage of the slipper bearings and the like used in universal joints and similar devices, and particularly to accomplish this by resort to a novel hinged construction which enables each bearing to adjust itself to changes in configuration of the supporting surface as the cooperating bearing parts wear away in service.

A further object is to so arrange the slipper bearings that the end sections thereof are readily interchangeable.

Yet another object is to enable the slipper bearings to properly adjust themselves rotatively to the configuration of the bearing surfaces within the female member.

Yet other objects are to provide a novel slipper bearing of simple and economical construction, and which will be efficient and practical in use.

Other and further objects of my invention will be apparent from the following description and claims and will be understood by reference to the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is a fragmental elevational view of a portion of a rolling mill equipped with bearings embodying the present invention;

Fig. 2 is an enlarged plan view of a portion of a slipper bearing embodying the present invention;

Fig. 3 is an end elevational view of the bearing;

Fig. 4 is a longitudinal sectional view taken substantially on the line 4—4 on Fig. 2;

Fig. 5 is a cross-sectional view taken through a universal coupling and showing the manner in which the slipper bearings are disposed therein; and Fig. 6 is a longitudinal sectional view of the universal coupling taken substantially on the line 6—6 on Fig. 5.

The slipper bearings of the present invention may be expeditiously utilized in rolling mills of the character fragmentally shown in Fig. 1. The rolling mill 10 therein illustrated includes opposed rolls 11 having reduced end portions or pintles as 12 which are journaled in bearings as 13 carried by frame members as 14. As shown, the reduced portions 12 at one end of the pair of rolls 11 extend beyond the frame member 14 in which they are journaled and are connected to spindles 15 by means of universal joints or couplings generally designated 16. The spindles 15 are in turn connected by means of universal couplings 17 to stub shafts 18 journaled in a frame member 19. Gearing 20 carried by the stub shafts 18 serves to connect these stub shafts to suitable driving means (not shown) for the purpose of rotatively driving the spindles 15 and connected rolls 11. The spindles 15 are partially supported by thrust bearings 21 disposed midway between the frame members 14 and 19.

Inasmuch as the material upon which the rolls 11 operate may vary in thickness, provision is made for varying the vertical spacing of these rolls to accommodate the different thicknesses of material. Customarily the bearings as 13 which carry the upper roll 11 are arranged to be adjusted vertically in the frame members as 14, and through the medium of a linkage 22 attached to the bearing 13 such adjustment of the upper roll 11 to a position such as is indicated in broken lines in Fig. 1 also serves to position the thrust bearing 21 for the upper spindle 15 in such a manner that it may continue to support this spindle and thus relieve the universal coupling 17 of the major portion of any axial thrust which may be caused due to the weight of the spindle 15. The universal couplings 16 and 17 maintain driving connections between the upper spindle 15 and its associated roll 11 and the stub shaft 18 despite the lack of longitudinal alignment of these members when they are in positions such as are indicated by broken lines in Fig. 1.

As commonly constructed, each universal coupling as 16 or 17 comprises a female member 25 formed on or secured to an end of a spindle as 15. As shown in detail in Figs. 5 and 6, each female member 25 is bifurcated to receive a tongue or male member 26 provided on the adjacent end of a stub shaft as 18 or a pintle as 12 as the case may be. The bifurcation in the female member 25 is arcuately recessed as indicated at 27, and these recesses afford bearing seats for the end sections of the slipper bearings, such recess extending through the female member 25 transversely with respect to the axis of the spindle 15. The female member is more deeply recessed at the central portion between the ends of the aforesaid recesses, as indicated at 28, than it is at 27, for a reason which will appear presently.

In order to transmit torque between the male and female members of the universal coupling, a pair of segmental slipper bearings generally designated 30 are interposed between these members, one such slipper bearing being disposed on each side of the tongue 26. Each slipper bearing as 30 has a medial boss portion 31 provided with a convex surface 32, Fig. 3, which is faced toward but usually spaced from the face of the arcuate recess 28 in the female member 25 when the slipper bearings are assembled in the coupling as shown in Fig. 6. The bosses 31 are interconnected and maintained in spaced relation by a bearing pin 33 having reduced end portions 34 which are received in holes 35, Fig. 2, extending through the bosses 31. The tongue 26 of the coupling is bifurcated as indicated at 37, Figs. 5 and 6 for receiving the pin 33, sufficient clearance being provided between the pin 33 and tongue 26 to permit assembly and operation thereof in their operative association.

Each slipper bearing is provided with end sections 40, Figs. 2, 4 and 5, having convex surfaces as 41, Fig. 3, that are adapted to conform with the arcuate recesses 27 in the female members 25, and opposite these convex surfaces 41 said end sections 40 have flat faces 42 against which the faces of the tongue 26 may bear when torque is being transmitted by the universal coupling, as shown in Fig. 5. The arcuate recesses 27, Fig. 6, in the female member act as bearing surfaces with which the convex surfaces 41, Fig. 3, of the slipper bearings cooperate when the slipper bearings are in service. Depending upon the manner in which the male and female members 25 and 26 are being driven, one or the other of the end sections 40 is required to withstand substantially the entire stress acting upon each slipper bearing 30 in the course of exerting the torque required to overcome the load resistance. For example, assuming that the spindles 15 are driven rotatively in such a direction that the female member 25 of a universal coupling 16, Fig. 1, rotates clockwise as viewed in Fig. 5, the tongue 26 tends to bear against only one of the end sections 40 of each slipper bearing 30 in the manner indicated in somewhat exaggerated fashion shown in Fig. 5.

When the shafts on which the male and female members 26 and 25 are respectively formed or secured are not in alignment longitudinally, as is the case when the upper spindle 15 is in the broken-line position shown in Fig. 1, the slipper bearings 30 rock back and forth within the female member 25, Fig. 6, as the shafts are being rotated. In this regard it should be noted that there is also a tendency for the slipper bearings to shift longitudinally in alternate directions, Fig. 5, but in the present instance such movement is restrained by the end faces 43 of the bosses 31 abutting the shoulders as 44, Fig. 6, at the ends of the recess 28. Due to the rubbing action of the more heavily stressed bearing end sections 40 against their cooperating bearing surfaces 27 in the female member 25, the wearing away of the material in these end sections and the cooperating portions of the female member is more rapid than in the case of the opposite end sections 40 and their cooperating surfaces 27. The greatest amount of wear takes place at the outward extremities of the more heavily stressed end sections 40.

Such uneven wearing away of the material forming the cooperating bearing surfaces in the universal coupling has a tendency to weaken the support afforded by the female member 25 to the more heavily stressed end sections of the slipper bearings. Heretofore, when relatively rigid one-piece slipper bearings were employed, such uneven wear has caused bending strains to be set up in the slipper bearings and this has occasionally caused the more heavily stressed end section of a bearing to break off and possibly be thrown out of the coupling due to centrifugal forces. As hereinabove stated, it is an object of my invention to circumvent this undesirable condition, and to this end I have in the present instance resorted to a three-piece, hinged construction of the slipper bearings in which the end sections are capable of at least limited pivotal movement relative to the central bosses of the bearings so as to enable the slipper bearings to adjust themselves to any changes in configuration of the cooperating bearing surfaces as the parts gradually wear away in service. I have found that such hinged construction obviates the detrimental effects of the aforesaid bending strains which have been responsible in a large measure for breakage of the one-piece slipper bearings heretofore employed in universal couplings.

As shown in Figs. 2 to 5, the boss 31 of each slipper bearing is provided with two hinge or pivot pins 45 which are tightly mounted in cylindrical sockets 46 extending across the boss 31, these pins 45 being disposed one on each side of the opening 35 and parallel to the end faces 43 of the boss. An opening 47 is formed in each end face 43 of the boss 31 midway between the side faces 48 thereof, and two similar openings 49 are formed in each end face 43 one on each side of and equally spaced from the opening 47, all of these openings 47 and 49 communicating with the adjacent socket openings 46. A stud 50, threaded at one end thereof, is inserted through each opening 47 and is screwed into a suitable tapped opening in the adjacent pivot pin 45, as shown in Fig. 5. The other end of each stud 50 projects from the end face 43 of the boss 31 and fits in a socket 51 formed midway between the side faces at the inner end of each section 40 of the slipper bearing. The outer end of each socket 51 is countersunk to facilitate insertion of a stud 50 into the socket and when the stud is seated in the socket each end section 40 is accurately centered with respect to the boss 31. Openings 52 extend longitudinally through the end sections 40 in alignment with the openings 49 in the boss 31, as shown in Figs. 2 and 4, and bolts 53 pass through the openings 52 and 49 and are threaded into tapped openings in the pivot pin 45 to thereby secure the end sections 40 to the boss 31.

A sufficient clearance is provided for the bolts 53 and studs 50 in the openings 49 and 47 in the boss 31 to enable a certain amount of rotative movement of the pins 45 in their sockets 46, and the faces of the end sections 40 opposing the end faces 43 of the boss 31 are spaced from these end faces and are slightly rounded, as indicated at 54, Fig. 4, to afford clearance for pivotal movement of the end sections 40 relative to the boss 31 of the slipper bearing 30. To insure such spacing, the pins 50 are longer than the depth of the sockets 51 and hence when the free ends of the pins bottom in the sockets, the desired spacing is afforded. However, the pins 45 are so fitted in the respective sockets 46 that appreciable force must be applied to the end sections 40 to cause the pins to rotate in the sockets 46. This pivoted interconnection of the boss 31 and end sections 40 is a highly important feature in that it enables the end sections 40 to adjust themselves to the configuration of the bearing surfaces 27 in the female member 25 with which they are adapted to cooperate in the event the need so to do arises because of wear between the parts, the forces to which the end sections 40 are subjected in operation of the coupling of which they are a part being sufficient to cause the necessary and compensating pivoting of the end sections as 40 relative to the boss as 31.

For example, referring to Fig. 5, the wearing away of the more heavily stressed end section 40 of each slipper bearing 30 and of the material forming the bearing surface 27 in the female member 25 enables this end section 40 to pivot relative to the boss 31, instead of setting up a bending strain in the slipper bearing 30 at the junction of the end section 40 and boss 31 as would be the case with a one-piece slipper bearing. In view of this, the likelihood of breakage is greatly reduced, if not altogether eliminated, at least insofar as rotative stresses are concerned.

Referring to Fig. 5 it will be seen that the recesses or grooves 28 and the bosses 31 are so related in size that the bosses normally do not bottom in these grooves. Moreover, clearance is provided between the shoulders, afforded on the bearing pins as 33 by the reduced end portions 34 thereof, and the flat faces of the bosses 31. Hence when there is relative pivoting between an end section 40 and its cooperating boss 31, the boss 31 may move into an adjusted position in the groove 28 and it is this coupled with the hinged interconnection of the end section to its boss that relieves the bearing of shearing strains to which it might otherwise be subjected. Such adjustment of the boss as 31 in its groove as 28 will only be required when there is appreciable wear or in those instances where the wear is such that the point of pivoting is not the axis of a pin as 45.

When it is desired to replace an end section 40, this may be done without disassembling the universal coupling by merely loosening the bolts 53 and withdrawing the old end section, inserting the bolts 53 in the new end section and then mounting the new end section in place. The stud 50 serves to guide the new end section into its proper position, whereupon the bolts 53 may be screwed into the pivot pin 45. It should also be noted that the end sections 40 are so constructed that they may be interchanged to equalize the wear thereof.

From the foregoing it will be apparent that I have provided a slipper bearing structure in which the pivotal mounting of the end sections as 40 enables the slipper bearings to adjust themselves to the configuration of the bearing surfaces in the female member 25 in such a manner as to minimize the strains to which the bearings are ordinarily subjected while in service, thereby prolonging the useful life thereof. Moreover, the slipper bearings are of simple and economical construction and are so arranged that replacement of worn or otherwise damaged parts is greatly facilitated.

Thus, while I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:
1. A slipper bearing for use in a universal coupling of the character described and comprising a medial boss portion, two end sections disposed on opposite sides of said boss, and means hingedly interconnecting said boss and said end sections for thereby enabling the slipper bearing to conform with the cooperating bearing surfaces in said coupling while in service without producing bending strains between said boss and said end sections.

2. A slipper bearing for use in a universal coupling of the character described and comprising a medial boss portion, at least one end section disposed on one side of said boss, and means so connecting said end section to said boss as to enable relative movement between the connected end section and said boss.

3. A slipper bearing for use in a universal coupling of the character described and comprising a medial boss portion, at least one end section disposed on one side of said boss, and means pivotally connecting said end section to said boss to enable relative movement between said end section and said boss.

4. A slipper bearing as set forth in claim 3, in which said end section is removably attached to said boss by said pivotal connecting means.

5. A slipper bearing as set forth in claim 3, in which said pivotal connecting means is sufficiently tight to restrain said end section against movement relative to said boss until appreciable force is applied to said end section.

6. A slipper bearing for use in a universal coupling of the character described and comprising a medial boss portion, two end sections extending in opposite directions from said boss, and means pivotally connecting said end sections to said boss and including two pivot pins respectively disposed in sockets in said boss adjacent said end sections and rotatable about axes transverse to the direction of extent of the corresponding end sections, and said means also including means securing said end sections to the respective pivot pins, said boss being formed to provide sufficient clearance around said securing means for enabling said pins and their connected end sections to move pivotally relative to said boss whereby bending strains between said boss and end sections may be avoided.

7. A slipper bearing as set forth in claim 6, in which said end sections are removably attached to said boss by said pivotal means.

8. A slipper bearing as set forth in claim 6, in which the pins are tightly mounted in sockets whereby pivoting of the end sections relative to the medial boss is effective only when appreciable force is applied to such end sections.

9. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with the recesses and also having flat faces respectively disposed toward opposed flat faces of said tongue, each of said slipper bearings comprising a medial boss portion and two end sections extending in opposite directions from said boss longitudinally of such bearing, a bearing pin passing through the opening in said tongue and joining the bosses of said slipper bearings, and hinge means connecting said bosses to their respective end sections and enabling relative movement of the parts interconnected thereby in a direction generally perpendicular to said flat faces, thereby to enable said convex faces of said end sections to conform with and seat firmly against said arcuate recesses during transmission of torque by said coupling.

10. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and wherein the medial parts of such recesses are deepened, the combination of a pair or slipper bearings respectively disposed in the arcuate recesses and including convex faces to conform with the recesses on opposite sides of the deepened portions thereof, said slipper bearings also having flat faces respectively disposed toward opposed flat faces of said tongue, each of said slipper bearings comprising two end sections and a middle boss portion of greater thickness than said end sections, the boss portion being disposed in the deepened portion of the recesses in which the bearing is disposed, each such boss portion being arranged in the deepened portion of the recess to enable movement of the boss portion toward and outwardly from the face of the deepened portion of the recess, the end section extending in opposite sections from said boss longitudinally of the bearing, a bearing pin passing through the opening in said tongue and joining the bosses of said slipper bearings, and hinge means disposed between and connecting said bosses to the end sections associated therewith and enabling relative movement of the parts interconnected thereby, said boss portions being capable of movement in the deepened portions of said recesses upon relative movement between such a boss portion and at least one of the end sections connected thereto by said hinge means.

11. A slipper bearing for use in a universal coupling of the character described and comprising a boss portion, two separate end sections respectively disposed on opposite sides of said boss and extending therefrom, said boss having sockets therein, a pivot pin in each of said sockets and each pin being rotatable about an axis transverse to the direction of extent of said end sections from said boss, and means connecting said end sections to said pivot pins whereby said end sections may pivot about the axes of said pins relative to said boss.

12. A slipper bearing for use in a universal coupling of the character described and comprising a boss portion, two separate end sections respectively disposed on opposite sides of said boss and extending therefrom, said boss having sockets therein, a pivot pin in each of said sockets and each pin being rotatable about an axis transverse to the direction of extent of said end sections from said boss, means spacing each of said end sections from the adjacent portion of said boss, and means connecting said end sections to said pivot pins whereby said end sections may pivot about the axes of said pins relative to said boss.

13. A slipper bearing for use in a universal coupling of the character described and comprising a boss portion, two separate end sections respectively disposed on opposite sides of said boss and extending therefrom, said boss having sockets therein, a pivot pin in each of said sockets and each pin being rotatable about an axis transverse to the direction of extent of said end sections from said boss, means spacing each of said end sections from the face of said boss, and the adjacent faces of said end sections adjacent to said boss being rounded to enable relative pivotal movement between said end sections and said bosses, and means connecting said end sections to said pivot pins whereby said end sections may pivot about the axes of said pins relative to said boss.

14. A slipper bearing for use in a universal coupling of the character described and comprising a boss portion, two separate end sections respectively disposed on opposite sides of said boss and extending therefrom, a pair of pivot pins disposed in sockets in said boss respectively adjacent said end sections and rotatable about axes transverse to the direction of extent of said end sections, a pair of centering pins each secured to a respective one of said pivot pins and projecting from said boss toward the adjacent end section, each of said end sections being provided with a countersunk socket for receiving its centering pin to be guided thereby when such end section is being assembled in operative relation to said boss, and bolts passing through said end sections and screwed into said pivot pins to thereby removably fasten said end sections to said boss, said boss being formed with sufficient clearance around said centering pins and said bolts to enable said end sections and their connected pivot pins to move pivotally relative to said boss when the slipper bearing is in service.

15. A slipper bearing for use in a universal coupling of the character described and comprising a boss portion and two end sections respectively disposed on opposite sides of said boss and extending therefrom, at least one of said end sections being formed separately from said boss, a connecting member mounted on said boss for pivotal movement relative to said boss and about an axis transverse to the direction of extent of said end sections, and at least one fastening bolt extending longitudinally of said separately formed end section and removably securing said end section to said pivoted connecting member for pivotal movement therewith relative to said boss.

16. A boss section for use as an element of a multi-element slipper bearing, said boss section comprising a member having an arcuate surface and an oppositely facing substantially flat surface, and a connecting element mounted on said member for pivotal movement and providing a hinge axis located substantially parallel to said flat surface and substantially perpendicular to the axis upon which said arcuate surface is centered.

THOMAS J. HEALY.